March 2, 1954  G. B. DOREY  2,670,974
TAKE-UP DEVICE FOR SLACK ADJUSTERS
Filed July 11, 1952  3 Sheets-Sheet 1
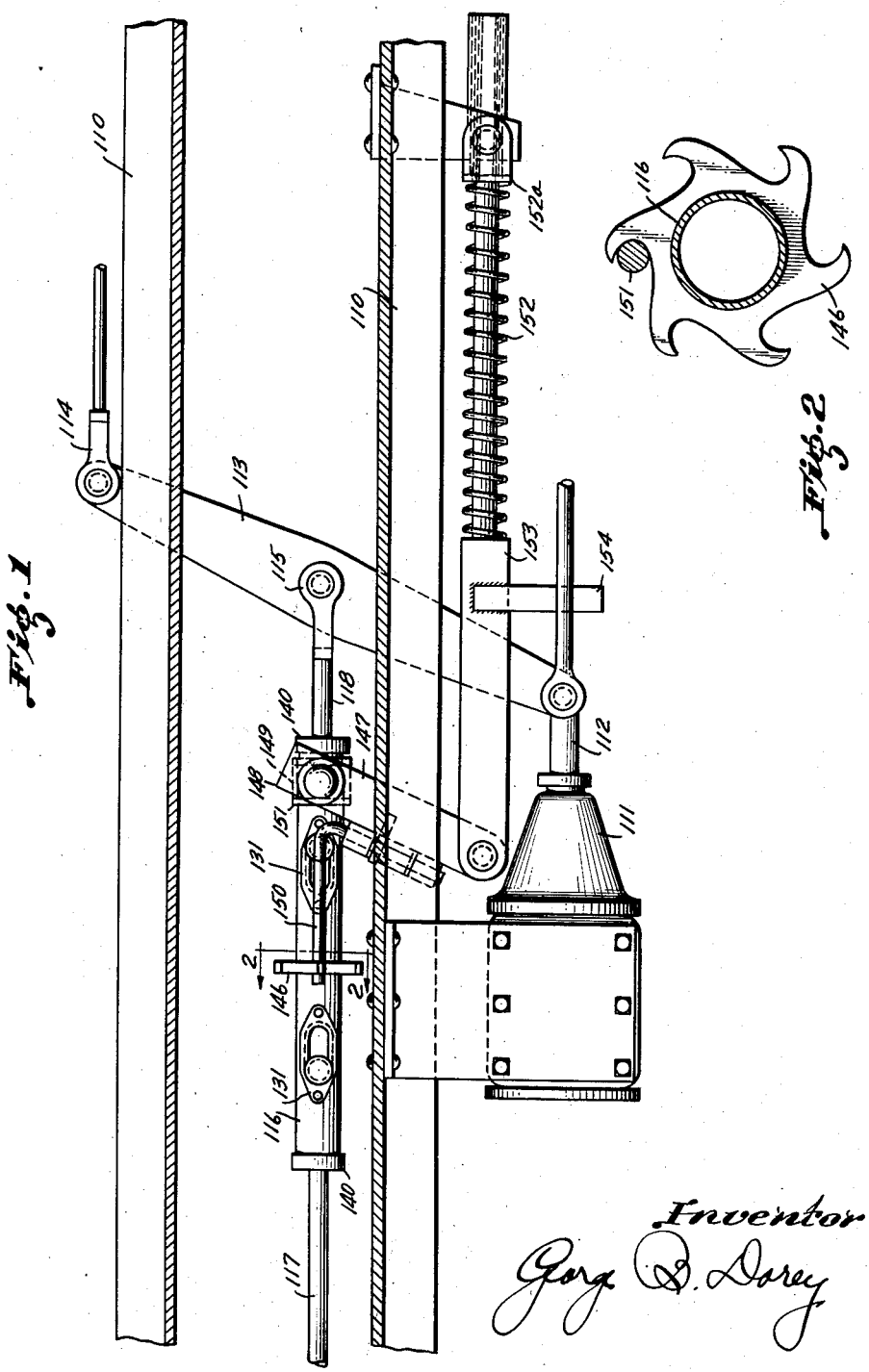
Inventor
George B. Dorey

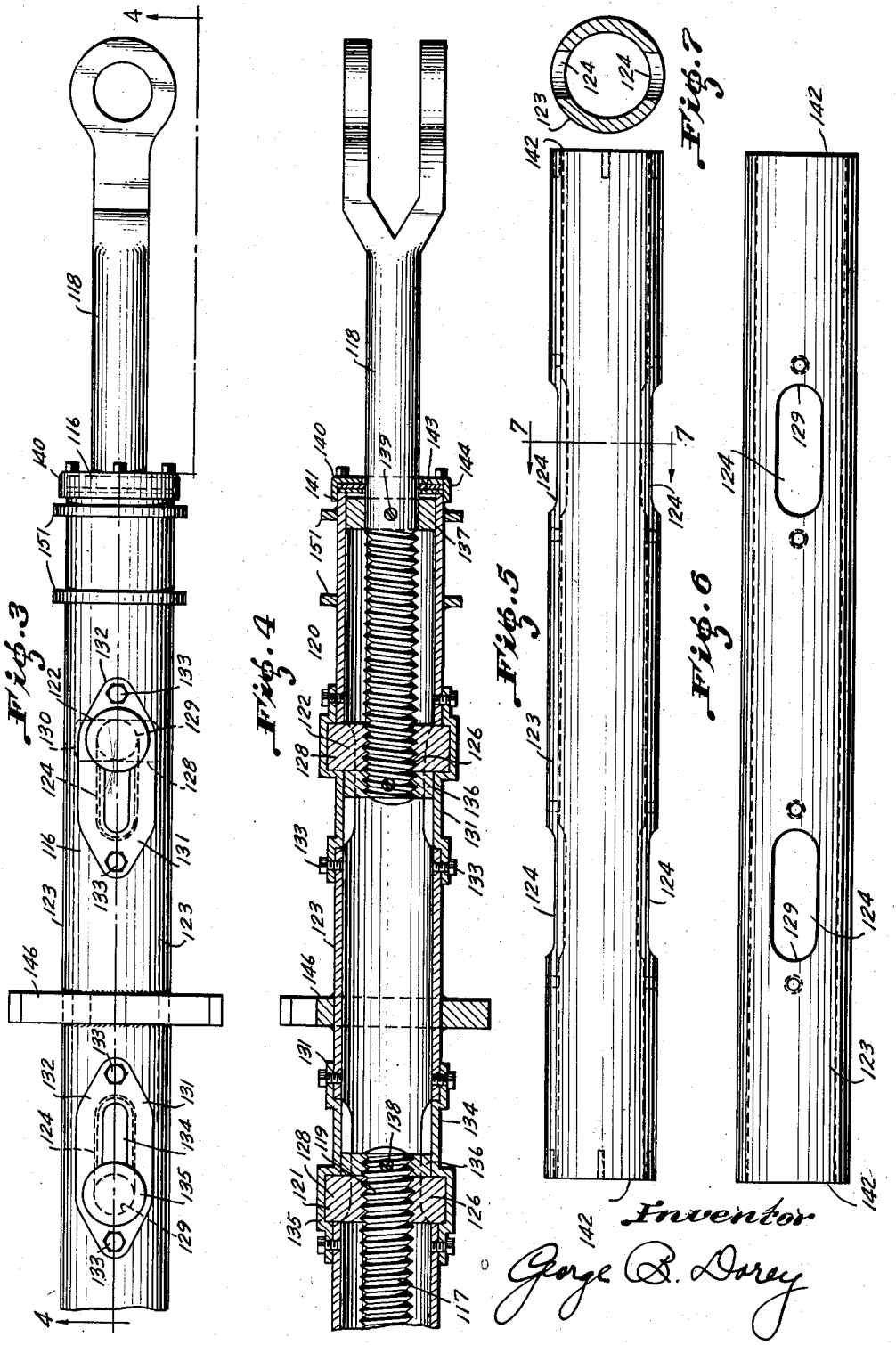

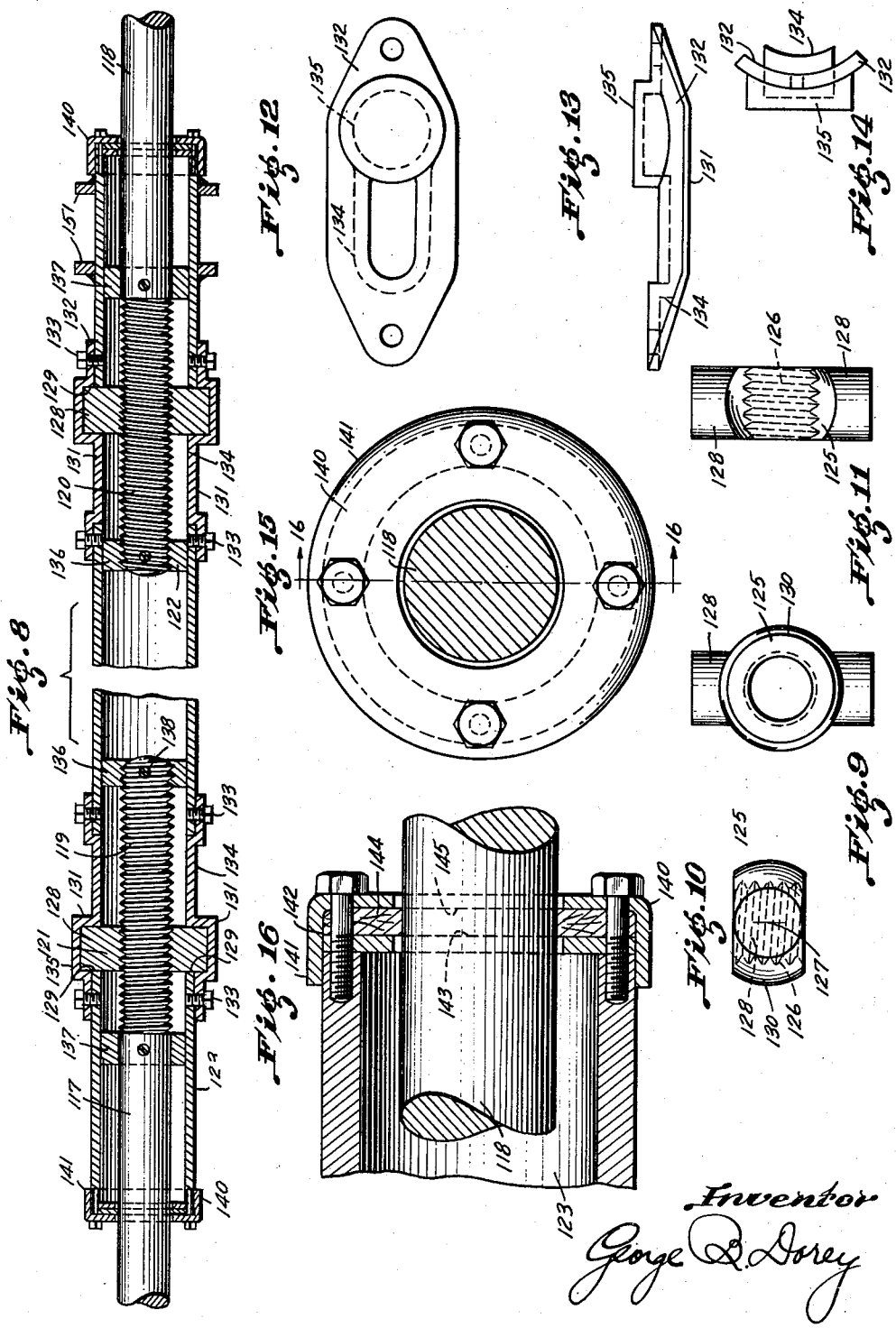

Patented Mar. 2, 1954

2,670,974

UNITED STATES PATENT OFFICE 2,670,974

TAKE-UP DEVICE FOR SLACK ADJUSTERS

George B. Dorey, Westmount, Quebec, Canada, assignor to Continental Transport Appliances, Limited, Montreal, Quebec, Canada, a corporation of Canada Application July 11, 1952, Serial No. 298,342

3 Claims. (Cl. 287—60)

The invention relates to an improved take-up device for a slack adjuster embodying screw-threaded rods and complementary threaded nuts carried by a housing structure which serves to adjustably unite the respective rods.

Objects of the invention among others are to provide a screw take-up device having screw-threaded sections completely enclosed and fully protected against rust and corrosion; to provide a structure having a housing enclosing the screw parts of a slack take-up device and sealed to retain a lubricant; to provide a structure wherein the screwthreaded part of an adjustable rod is relieved of weight and auxiliary supporting means are provided on a screwthreaded rod for supporting a housing structure; and to provide a take-up device having an improved tubular cylindrical housing for accommodating the screw-threaded ends of a divided threaded connection and to provide shouldered nuts for said rods for transmitting pulling strains through the rods and housing; and more specifically to provide a telescoping structure wherein screwthreaded nuts are retained in openings formed in the walls of an outer casing and certain features of the invention reside in the details concerned with the making up of the assembly.

For further comprehension of the invention reference may be had to the accompanying drawings wherein:

Fig. 1 is a plan view of a portion of a car structure showing the improved take-up device incorporated as part of an automatically operable slack adjuster in the brake leverage system of a railway car.

Fig. 2 is a vertical sectional view taken through the take-up device on a line 2—2 of Fig. 1.

Fig. 3 is a fractional plan view on an enlarged scale of the take-up device showing as much of the device as necessary to illustrate the improvement.

Fig. 4 is a longitudinal vertical sectional view taken on a line 4—4 of Fig. 3.

Fig. 5 is a detached elevational side view of the cylindrical tubular housing.

Fig. 6 is a plan view of the housing shown in Fig. 5.

Fig. 7 is a transverse vertical sectional view taken through the housing on a line 7—7 of Fig. 5.

Fig. 8 is a broken vertical longitudinal sectional view taken through the take-up device showing the take-up device with the extent of take-up at different distances from the nuts.

Fig. 9 is an elevational frontal view of one of the nuts.

Fig. 10 is a plan view of the nut shown in Fig. 9.

Fig. 11 is a side elevational view of the nut shown in Fig. 9.

Fig. 12 is a plan view on an enlarged scale of one of the cap members.

Fig. 13 is a side longitudinal elevational view of the cap member shown in Fig. 12.

Fig. 14 is an end view of the cap member shown in Figs. 12 and 13 as viewed from right to left of said figures.

Fig. 15 is an end view on an enlarged scale of the take-up device.

Fig. 16 is a vertical sectional view through one end of the take-up device as seen on a line 16—16 of Fig. 15.

In said drawings the improvement is shown as applied to the brake system of a railway car structure wherein 110 indicates the center sills having a brake cylinder 111 carried thereby which in turn operates a push rod 112. Pivotally connected at one end of the push rod is a brake lever 113 and the opposite end of said lever is connected with a top rod 114 whereby connection is effected with the brake of one of the trucks (not shown).

The lever 113 intermediate its ends is interconnected with another lever to the companion truck (not shown) by means of a center rod connection 115 which incorporates therein the improved take-up device 116 with which the present improvement is concerned.

The center connection is divided lengthwise into two separate sections 117 and 118 and the end of each respective section is screwthreaded to present right and left hand screwthreaded ends indicated at 119 and 120 respectively. Co-operating with the screwthreaded portions 119 and 120 are complementary screwthreaded nuts 121 and 122 respectively.

The screwthreaded sections of the rods are extended within a cylindrical tubular housing 123 which includes transversely aligned elongated openings 124 in the wall of the said housing.

The nuts 121 and 122 are of similar construction differing only in the direction of rotation of the screwthread and the description therefore will be confined to one of said nuts. The nut is formed with a body portion 125 which is interiorly threaded at 126 to receive the complementary threaded rod. Extending laterally from each side of the body portion 125 and lying in transversely aligned relation on a common axis 127 are trunnions 128. The trunnions 128 are of circular section and extend within the aligned openings 124 to lie in correspondingly shaped seats 129 at the outer end of the said openings 124 for the purpose of transmitting pulling strains from the rod sections to the housing through the medium of said nuts.

The arcuate shaped seats 129 provided at the connection between the trunnions and the housing allow for limited pivotal movement about the axis 127 of the trunnions thereby providing for self adjustment between the rods and housing.

The side face of the body of the nut on each side of the trunnion portions is contoured to present a generally spherical shaped surface 130 to allow for turning movement of the nut in the housing about axis 127 during insertion inasmuch as the nut is turned from its normal transversely disposed position and inserted through the elongated openings while lying in a lengthwise position and thereafter swung back to its normal crosswise position, it being understood that the body of the nut corresponds generally in thickness to the diameter of the trunnion sections.

The nut is maintained in proper seating relation in the end bearings 129 of the openings 124 by means of cap plates 131 which overlie the said openings and include a base portion 132 which overlaps the boundaries of the openings and is secured in place on the housing by cap screws 133. The cap plate includes a depressed section 134 which extends within the opening 124 and acts as a centering spigot to fix the cap plate in place in the opening and adjacent the trunnion 128 there is provided a raised portion forming a circular shaped pocket 135 which embraces the said trunnion section 128. The nut is thus maintained in definite axial relation in the housing being prevented from axial movement in one direction by the seat 129 and in the opposite direction by the pocket 135.

The nuts 121 and 122 although maintained in definite axial relation to the housing and mounted to revolve in unison therewith still retain a sufficient degree of independent movement as to be self aligning to compensate for variations arising from wear and irregularities in manufacture.

In order to relieve the screwthreads from carrying strains and prevent binding between the rods and nuts there are provided hub-like bearings 136 and 137 secured to each rod as indicated at 138 and 139 respectively. The bearings 136 and 137 are disposed on opposite sides of the nut and are preferably located at the opposite ends of the screwthreaded portion of the rod thereby providing bearings for the housing.

With a divided center rod structure such as shown herein and the hub-like bearings duplicated on each rod section there is provided a stable support for revolubly supporting the housing and the nuts then function as floating members.

In order to accommodate and hold lubricants within the take-up device, the housing at each end of the tubing is closed by a cap 140 which is flanged at 141 to embrace the end of the tube and interposed between said cap and the end face 142 of the tubing is a plate washer 143 and a felt packing 144, the latter being sandwiched between the washer 143 and the end inner face 145 of the end wall of the cap 140.

Operation of the take-up device is effected by rotation of the housing and this may be accomplished either manually or by automatically operable means and in the present embodiment the improvement is shown in connection with an automatically operable slack adjuster mechanism. The operating mechanism includes a toothed ratchet wheel 146 fixedly mounted on the housing and co-operable therewith is a bell crank lever 147 having an operating arm 148 swingingly mounted on a saddle member 149, and another arm 150 mounted on the operating arm for intermittent engagement with the teeth of the ratchet wheel. The saddle member 149 is seated on the housing between spaced walls 151—151 and is thereby maintained against axial displacement.

Operation of the bell crank lever in a take-up direction is effected by a spring 152 which reacts against a bracket 152a and said spring is tensioned during the brake applying movement of the brake through the medium of an operating rod 153 having a lateral arm 154 lying in the path of movement of the push rod and moved by the latter. The method of operation does not form part of the invention forming the subject of the present application and any suitable operating means may be employed for effecting operation of the slack adjuster.

What I claim as new is:

1. In a take-up mechanism for a slack adjuster including a connection divided lengthwise to present two rod sections and having the adjacent ends of the respective rod sections screwthreaded to present right and left hand screwthreaded portions; a cylindrical tubular member enclosing the screwthreaded portions of the respective rod sections, said tubular member having elongated openings formed in the walls thereof and disposed in transversely aligned relation; a screwthreaded nut threaded on each rod section, each said nut having laterally extending trunnion portions extending within the elongated openings of the tubular member.

2. In a take-up mechanism for a slack adjuster including a connection divided lengthwise to present two rod sections and having the adjacent ends of the respective sections screwthreaded to present right and left hand screwthreaded portions; a cylindrical tubular member enclosing the screwthreaded portions of the respective rod sections, said tubular member having transversely aligned elongated openings formed in the wall thereof; a screwthreaded nut having laterally extending trunnion portions extending within the elongated openings and arranged to seat against one end of the openings to transmit pulling strains between the respective rod sections through the medium of the housing; and a cap member overlying each opening and secured to the housing, each said member having an abutment engaging with the related trunnion to maintain the latter in seating engagement with the pulling face of the opening and prevent axial displacement of the nut relatively to the housing.

3. In a take-up mechanism for a slack adjuster including a connection divided lengthwise to present two rod sections and having the adjacent ends of the respective sections screwthreaded to present right and left screwthreaded portions; hub-like bearings adjacent the ends of the threaded portions of each rod section; a cylindrical tubular housing member enclosing the threaded portions of the rods, said tubular member being revolubly and supportingly associated with the hub-like bearings; and screwthreaded nuts disposed intermediate said bearings and threaded on the screwed portions of the rod sections, said nuts having projections co-acting with the walls of the housing to rotate in unison therewith.

GEORGE B. DOREY.

References Cited in the file of this patent

UNITED STATES PATENTS

| Number | Name | Date |
|---|---|---|
| 898,887 | Heyman | Sept. 15, 1908 |
| 1,226,830 | Walker | May 22, 1917 |
| 1,483,051 | Saunders | Feb. 5, 1924 |
| 1,715,680 | Shepherd et al. | June 4, 1929 |

FOREIGN PATENTS

| Number | Country | Date |
|---|---|---|
| 118,769 | Great Britain | Sept. 12, 1918 |
| 129,695 | Great Britain | July 24, 1919 |
| 610,203 | Germany | May 5, 1935 |